(12) United States Patent
Werner

(10) Patent No.: US 8,664,547 B2
(45) Date of Patent: Mar. 4, 2014

(54) PLATFORM SCALE USING SLOT BLOCK LOAD CELLS

(76) Inventor: Alton Werner, Granite Bay, CA (US)

( * ) Notice: Subject to any disclaimer, the term of this patent is extended or adjusted under 35 U.S.C. 154(b) by 487 days.

(21) Appl. No.: 12/927,467

(22) Filed: Nov. 15, 2010

(65) Prior Publication Data

US 2011/0061946 A1    Mar. 17, 2011

(51) Int. Cl.
  *G01G 3/14*    (2006.01)
  *G01L 1/04*    (2006.01)
  *G01L 1/22*    (2006.01)
  *G01G 3/08*    (2006.01)
  *G01G 3/10*    (2006.01)

(52) U.S. Cl.
  USPC ....... 177/211; 177/229; 177/238; 73/862.629

(58) Field of Classification Search
  USPC .............. 177/211, 229, 238–244; 73/862.629–862.634, 73/862.637–862.639
  See application file for complete search history.

(56) References Cited

U.S. PATENT DOCUMENTS

| | | | | |
|---|---|---|---|---|
| 2,706,626 A | * | 4/1955 | Reiser | 177/161 |
| 2,805,055 A | * | 9/1957 | Swanson | 177/211 |
| 2,823,911 A | * | 2/1958 | Murphy | 177/154 |
| 3,175,795 A | * | 3/1965 | Adams | 248/188.4 |
| 3,354,710 A | * | 11/1967 | Johnson | 73/862.52 |
| 4,601,356 A | * | 7/1986 | Muccillo, Jr. | 177/211 |
| 4,785,896 A | * | 11/1988 | Jacobson | 177/211 |
| 4,848,493 A | * | 7/1989 | Hitchcock | 177/211 |
| 4,881,606 A | * | 11/1989 | Halfon et al. | 177/126 |
| 4,993,506 A | * | 2/1991 | Angel | 177/211 |
| 5,332,182 A | * | 7/1994 | Weisz et al. | 248/188.4 |
| 5,714,695 A | | 2/1998 | Bruns | |
| 5,872,319 A | | 2/1999 | Bruns | |
| 5,925,832 A | | 7/1999 | Bruns | |
| 6,293,585 B1 | | 9/2001 | Bruns | |
| 6,407,351 B1 | * | 6/2002 | Meyer et al. | 248/188.4 |
| 6,499,360 B1 | | 12/2002 | Bruns | |
| 6,672,176 B2 | | 1/2004 | Bruns | |
| 6,711,960 B2 | * | 3/2004 | Kobayashi et al. | 73/862.629 |
| 7,679,009 B2 | * | 3/2010 | Weichao | 177/211 |
| 7,947,912 B2 | * | 5/2011 | Weichao | 177/211 |
| 2002/0178841 A1 | * | 12/2002 | Kobayashi et al. | 73/862.629 |
| 2003/0140714 A1 | * | 7/2003 | Barua et al. | 73/862.633 |
| 2006/0076166 A1 | * | 4/2006 | Burkhard et al. | 177/210 EM |
| 2006/0196705 A1 | * | 9/2006 | Hopkins | 177/229 |
| 2008/0271931 A1 | * | 11/2008 | Weichao | 177/211 |
| 2009/0183928 A1 | * | 7/2009 | Oseko et al. | 177/211 |
| 2010/0155152 A1 | * | 6/2010 | Weichao | 177/211 |

* cited by examiner

Primary Examiner — Randy W Gibson
(74) Attorney, Agent, or Firm — Heisler & Associates

(57) ABSTRACT

A load cell assembly is used with a scale having a weighing platform, in order to provide a very low clearance above a surface on which the scale is positioned. The load cell assembly has a load cell with first and second arms. A bridge portion of the load cell connects the arms, maintaining them in a substantially parallel relationship, with at least a portion of the second arm having a height that is larger than a height of the first arm and the bridge portion. A fastener attaches the load cell to the weighing platform, on the second arm portion with a larger height. A foot device, attached to the first arm, spaces the load cell above the surface on which the scale is positioned.

19 Claims, 3 Drawing Sheets

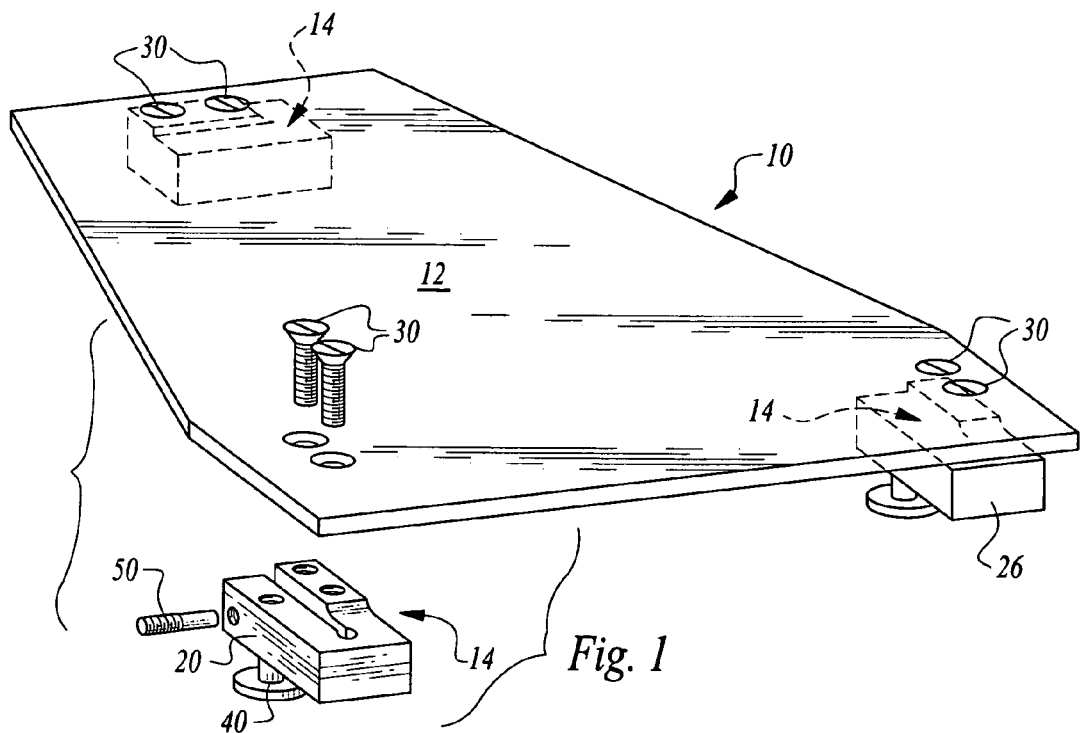
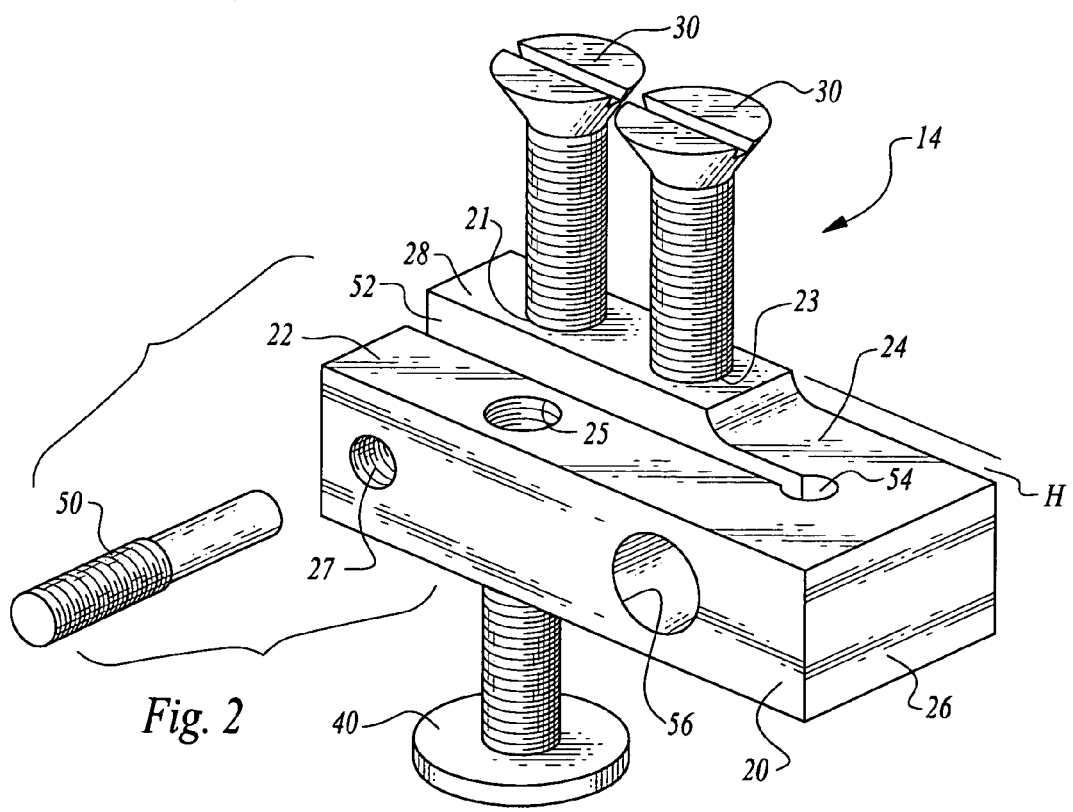

PLATFORM SCALE USING SLOT BLOCK LOAD CELLS

CROSS-REFERENCE TO RELATED APPLICATIONS

This application claims priority from International Patent Application No. PCT/US2009/044144 filed on May 15, 2009 and having a priority date of May 15, 2008.

FIELD OF THE INVENTION

The disclosed embodiments of the present invention relate to a platform scale that utilizes a plurality of slot block load cells.

BACKGROUND OF THE INVENTION

In the known prior art, many platform scales are known, but these tend to have a relatively high profile to them, due to the weighing mechanism deployed therein. As a result, either the weighing level is positioned above the surrounding floor, or, in the alternative, a depression has to be provided in the floor to permit a flat entrance onto the platform.

Torsional sensing load cells are known in the prior art, and several patents, including commonly-owned U.S. Pat. Nos. 5,714,695, 5,872,319, 5,925,832, 6,293,585, 6,499,360 and 6,672,176 are based upon this concept.

It is an unmet object of the prior art to provide a platform scale that has a sufficiently low profile to allow it to be placed on a surface and still provide a weighing surface that is within an inch or less of the surface on which it is placed. It is a further unmet object to provide a load cell that can be arranged with a platform to provide the desired low profile.

SUMMARY OF THE INVENTION

This and other unmet advantages are provided by a load cell assembly for use with a scale having a weighing platform with a low clearance above a surface. The load cell assembly comprises a load cell, means for fastening the load cell to the weighing platform, and means for spacing the load cell above the surface. The load cell itself has a first and a second arm. A bridge portion connects the respective arms, maintaining them in a substantially parallel relationship. At least a portion of the second arm has a height that is larger than a height of the first arm and the bridge portion. The fastening means is on the second arm portion with a larger height. The spacing means is on the first arm.

In some embodiments, the load cell is formed from a monolithic block piece of a metal, with the first and second arms being defined by a longitudinal slot cut into the block from one end of the block and terminating short of the opposite end of the block, which defines the bridge portion. In such an embodiment, the longitudinal slot may terminate internal to the monolithic block in an enlarged, rounded end.

In some of the embodiments, the load cell assembly also comprises a means for limiting relative displacement of the ends of the first and second arms, opposite the bridge portion. In some of these embodiments, the displacement-limiting means comprises a bore, passing transverse to a longitudinal axis of each of the arms near the ends opposite the bridge portion, and a pin, positioned in the bore of each of the arms.

In some embodiments, the weighing platform fastening means comprises at least one bore into the second arm portion having a larger height, and a fastener corresponding to each bore, sized to be threadingly received in the bore to which it corresponds.

In some embodiments, the surface spacing means comprises at least one bore into the first arm, and a foot, sized to be threadingly received in the bore to which it corresponds.

Other objects of the invention are achieved by a scale having a weighing surface less than one inch above the surface on which the scale is positioned. Such a scale comprises a weighting platform, an upper surface of which defines the weighing surface; and a plurality of the load cell assemblies described above, each load cell assembly arranged around a periphery of the weighing platform.

In some of the scales, the weighting platform will be a rigid planar sheet having a trapezoidal profile, and three load cell assemblies are used, with two placed near the corners of the longer of the two parallel sides of the trapezoidal platform and the third placed near a midpoint of the shorter of the parallel sides.

In another embodiment of the scale, the weighting platform comprises a rigid planar sheet having a rectangular profile, and four load cell assemblies are used, all of the load cell assemblies placed near the corners of the rectangular platform.

In a third embodiment of the scale, the weighing platform comprises a rectangular platform, defining an upper surface on which an object to be weighed is placed and an opposing lower surface and a first and a second channel, one of the channels formed along each of a pair of opposing sides of the rectangular platform, each channel being open towards the lower surface of the platform, each channel having a height selected to allow placement of a load cell assembly therein while positioning the platform lower surface in close proximity to the surface on which the scale is used. In such a case four load cell assemblies will be used with the weighing platform, all of the load cell assemblies placed inside the channels near the corners of the rectangular platform.

BRIEF DESCRIPTION OF THE DRAWINGS

A better understanding of the disclosed embodiments will be obtained from a reading of the following detailed description and the accompanying drawings wherein identical reference characters refer to identical parts and in which:

FIG. 1 is a partial section view of an embodiment of a platform scale;

FIG. 2 is an enlarged view of a slot block load cell as used in the FIG. 1 embodiment;

DESCRIPTION OF THE PREFERRED EMBODIMENT

Figure 3:
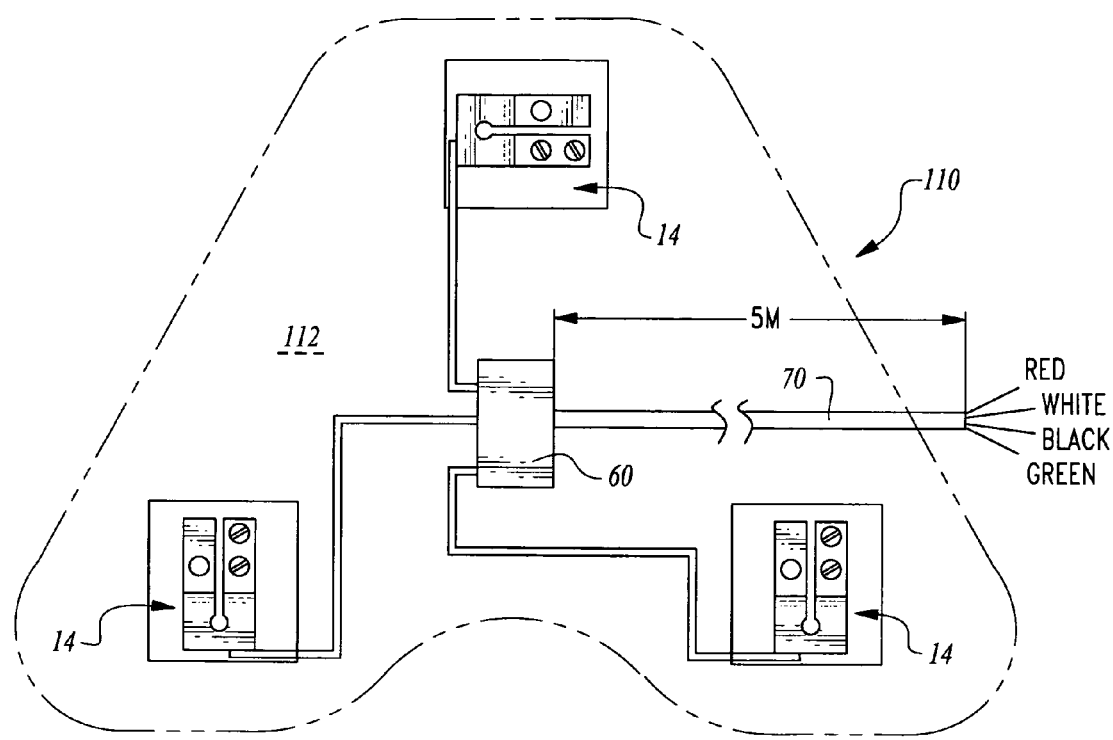
FIG. 3 is a top plan view of an exemplary wiring arrangement for a platform scale using the FIG. 2 load cell.

FIG. 1 shows an exemplary embodiment of the platform scale device 10. The device 10 has a platform 12 which is preferably rigid and planar, and also preferably rather thin in thickness while retaining its rigid nature. The platform 12 is trapezoidal. There are three torsional load cell assemblies 14, further details of which are disclosed below, deployed about the periphery of the platform 12. Of the three load cell assemblies 14, two are placed near the corners of the longer of the two parallel sides and the third assembly is placed at a midpoint along the shorter of the parallel sides. In the case of two of the load cell assemblies 14, the assemblies are positioned below the platform 12 in a manner that largely obstructs these assemblies from view, but, in the lower left corner of FIG. 1, a portion of the platform 12 is sectioned away so that the load cell assembly 14, including load cell 20 and its attachment to the platform with screws 30 is more clearly viewable.

Figure 4:
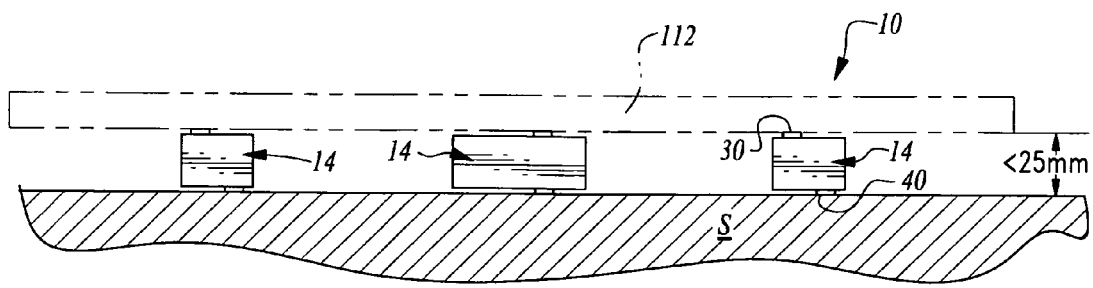
FIG. 4 is a side sectional view of the FIG. 3 embodiment.

FIG. 2 shows an exemplary load cell assembly 14, comprising a torsional load cell 20, means 30 for fastening the load cell beneath a lower surface of the platform (not shown in FIG. 2) and a means 40 for spacing the load cell above an underlying surface S (FIG. 4). Load cell 20 has first and second arms 22, 24, the respective arms intersecting at a bridge portion 26, which serves not only to connect the arms 22, 24, but maintains them in a parallel relationship to each other. A portion 28 of the second arm 24, and, specifically, the portion of the second arm that is furthest from bridge portion 26, has a height that is higher, by an amount H, than a height of the remainder of the second arm 24, the first arm 22 or the bridge 26, all of which have a substantially identical height. The means 30 for fastening the load cell beneath the platform is provided by a pair of screws, which are threadingly received in holes 21, 23 in higher portion 28. Other means 30 for fastening will be known and useful to those skilled in art, so long as the object is achieved, that is, allowing the lower surface of the platform to rest upon, and pass the gravitational force bearing thereupon solely onto, the higher portion 28.

The means 40 for spacing the load cell 20 above the underlying surface is exemplified in the illustrated embodiment by a foot 40 that is threadingly received in a hole 25 in a lower surface of the first arm 22. This sets up the torsional capability of the load cell 20. In the illustrated embodiment, the threaded shafts of screws 30 and foot 40 are arranged in parallel relationship. Further, the center of hole 25 and a midpoint between the centers of holes 21, 23 are, in the disclosed embodiment, at the same distance along their respective arms 22, 24, when measured from the bridge portion 26.

At the opposite end of the arms 22, 24, a limit pin 50 can be received in a hole 27 provided at the end of each of the arms (only the hole 27 in arm 22 is visible in FIG. 2), opposite the bridge portion 26. This limit pin 50 provides overload protection to the load cell. The pin 50 has a threaded portion which engages threads in the hole 27 in the arm 22. A remainder of the pin 50 is preferably unthreaded and resides in a hole in the arm 24 aligned with the hole 27 substantially colinearly. Clearance between the hole in the arm 24 and the unthreaded portions of the pin 50 can be selected to provide the amount of overload protection desired. Pin size and pin material can also be selected to provide the desired overload protection.

A further feature which may be noted in FIG. 2 is that load cell 20 can be formed by removing material from a monolithic block of a material, especially a metal such as aluminum or steel. In particular, arms 22, 24 may be formed by cutting a longitudinal slot 52 through a block of the material, the slot terminating at the bridge portion 26. In some embodiments, as illustrated, it is preferred to terminate slot 52 in a somewhat larger, rounded "keyhole" end 54, as seen in FIG. 2. It may also be useful to enhance the flexibility of the load cell by the use of one or more mass relief holes 56, one of which is visible in arm 22.

FIGS. 3 and 4 show, in respective top plan and side sectional views, a wiring arrangement for an embodiment of the platform scale device 110 having a generally triangular platform 112. Three torsional load cell assemblies 14 are deployed near the vertices of the platform 112 and standard wiring for each torsional load cell coupled to known prior art rotational displacement transducers associated with each load cell is directed to a central box 60, from which a signal output may be directed to an external electronics module through a wiring conduit 70. While FIG. 3 depicts an exemplary length from the central box 60 through the conduit 70, other lengths and specific wiring bundle details could be provided. It is noted that FIG. 4 also provides a clear depiction of how the bottom surface of platform 112 can be placed with 25 mm or so of the surface S on which the device 110 is being used.

Figure 5:
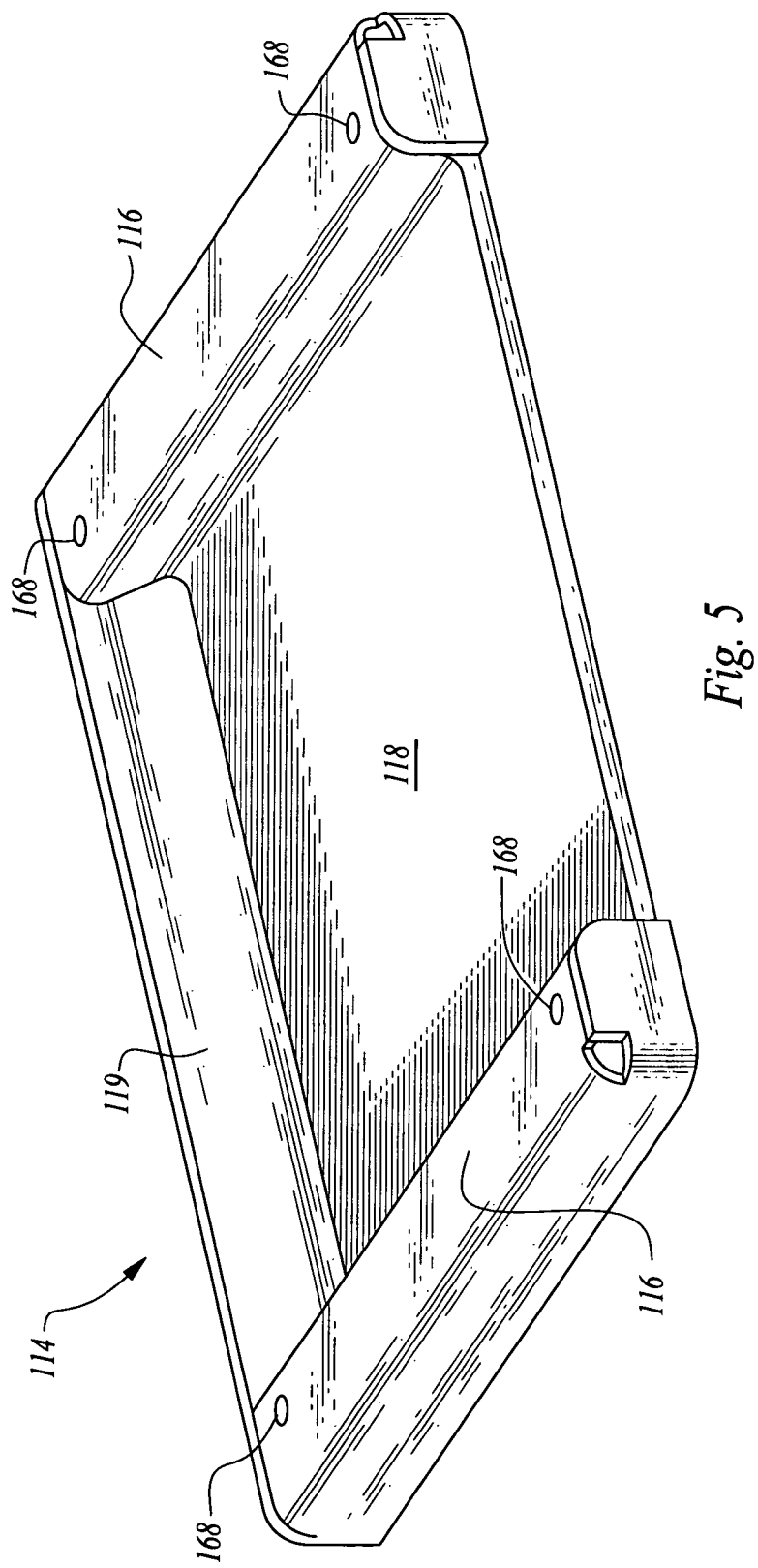
FIG. 5 is a perspective view of a platform for an alternate embodiment of the platform scale.

FIG. 5 shows a perspective view of an alternate platform 114 upon which a low ground clearance platform can be built, using a load cell assembly of the type taught in FIG. 2. This rectangular platform 114 is characterized by a pair of channels 116 having an "inverted-U" profile that are formed along a pair of the opposing sides. Rather than providing a rigid, planar platform (as is shown in FIG. 1), this alternate platform 114 uses the channels 116 to provide a raised area, with one of FIG. 2 load cell assemblies positioned inside the channel, an inside surface of one of the channels bearing directly on the load-receiving arm 24 of the FIG. 2 load cell assembly. Holes 168 in the corners of the platform 114 show the position where fastening means 30 would be used. In the illustrated embodiment, a planar weight-receiving surface 118 is provided and an upstanding support wall 119, along one of the remaining two sides, is one way in which the rigidity of the surface 118 can be maintained. In this way, even the upper surface of the weight-receiving surface 118 can be very close to the base surface S (FIG. 4) upon which the device is used. Such an arrangement allows easy loading and unloading of items onto the scale.

Applications of the embodiment described herein will be recognized by one of ordinary skill in this art. However, for exemplary purposes, several such applications are set forth with specificity.

In a first application, the device will be used to provide real time inventory control on a product stored in a keg or other cylindrical container. A particular example would involve a scale for a beer keg. Because of the low profile, even a full keg could be easily placed on the platform, which would typically have a circular profile when viewed from above, with three or more load cells distributed around the circumference of the platform.

In another application, the device will be used as a veterinarian scale for weighing animals. In this application, the platform is more likely to have a roughly rectangular profile, but a circular profile may be more appropriate in some circumstances. Depending upon the particular size of the animal being weighed, three or four load cells would be deployed about the periphery of the platform. With four cells, they would typically be deployed at corners. In a large animal application, it may be necessary to use from six to eight load cells.

In a third application, the device will be used as a scale for weighing a patient in a wheelchair. The low profile of the device allows the wheelchair to be easily rolled onto and off of the platform, which is likely to have a roughly rectangular profile. Three or four load cells would be deployed about the periphery of the platform. With four cells, they would typically be deployed at corners. This type of embodiment would also be useful as a bariatric scale.

In a particular variation on the wheelchair scale application, it may be useful in some situations to use two spaced-apart platform scales, which may be electrically interfaced with each other, to weigh a patient who is confined to a bed, particularly a gurney or other wheeled bed. In such as case, the bed could be rolled so that the front legs of the bed would be placed on the first of the devices and the rear legs of the bed would be rolled onto the second of the devices. In a particularly useful embodiment for this variation, each platform would be separately useful with a signal output that could be, in a single application, directed to an electronics module and, in a dual application, ganged with a signal output from the second platform to be directed to an electronics module. Similarly, a pair of spaced-apart platforms could also be used in many other applications to weigh products on wheeled trucks such as those used to move items around in a warehouse.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A load cell assembly for use with a scale having a weighing platform with a low clearance above a surface, the load cell assembly comprising:
   a torsional load cell, comprising a first and a second arm, and a bridge portion that connects the respective arms, maintaining the arms in a substantially parallel relationship, with at least a portion of the second arm having a height that is larger than a height of the first arm and the bridge portion; a means for fastening the torsional load cell to the weighing platform, on the second arm portion with a larger height; and a means for spacing the torsional load cell above the surface, on the first arm; and
   a rotational displacement transducer associated with each torsional load cell.

2. The load cell assembly of claim 1 wherein the load cell is formed from a monolithic block piece of a metal, the first and second arms defined by a longitudinal slot cut into the block from one end thereof and terminating short of the opposite end of the block, which defines the bridge portion.

3. The load cell assembly of claim 2 wherein the longitudinal slot terminates internal to the monolithic block in an enlarged, rounded end.

4. The load cell assembly of claim 1, further comprising:
   means for limiting relative displacement of the ends of the first and second arms, opposite the bridge portion.

5. The load cell assembly of claim 4 wherein the displacement-limiting means comprises:
   a bore, passing transverse to a longitudinal axis of each of the arms near the ends opposite the bridge portion; and
   a pin, positioned in the bore of each of the arms.

6. The load cell assembly of claim 1, wherein the weighing platform fastening means comprises:
   at least one bore into the second arm portion having a larger height; and
   a fastener corresponding to each at least one bore, sized to be threadingly received in the bore to which it corresponds.

7. The load cell of claim 1, wherein the surface spacing means comprises:
   at least one bore into the first arm; and
   a foot, sized to be threadingly received in the bore to which it corresponds.

8. A scale having a weighing surface less than one inch above the surface on which the scale is positioned, the scale comprising:
   a weighting platform, an upper surface of which defines the weighing surface;
   a plurality of load torsional cell assemblies arranged around a periphery of the weighing platform;
   each said load cell assembly including a first and a second arm, and a bridge portion that connects the respective arms, maintaining the arms in a substantially parallel relationship, with at least a portion of the second arm having a height that is larger than a height of the first arm and the bridge portion; a means for fastening the torsional load cell to the weighing platform, on the second arm portion with a larger height; and a means for spacing the torsional load cell above the surface, on the first arm; and
   a rotational displacement transducer associated with each torsional load cell.

9. The scale of claim 8 wherein each said load cell is formed as a unitary mass of material with said first arm and said second arm parallel to each other and spaced apart by a slot formed between said first arm and said second arm.

10. The scale of claim 8 wherein the weighting platform comprises a rigid planar sheet having a rectangular profile; and
    four load cell assemblies are used, all of the load cell assemblies placed near the corners of the rectangular platform.

11. The scale of claim 8 wherein the weighing platform comprises: a rectangular platform, defining an upper surface on which an object to be weighed is placed and an opposing lower surface; and a first and a second channel, one of the channels formed along each of a pair of opposing sides of the rectangular platform, each channel being open towards the lower surface of the platform, each channel having a height selected to allow placement of a load cell assembly therein, but with said channel height less than a height of said load cells while positioning the platform lower surface in close proximity to the surface on which the scale is used; and four load cell assemblies are used, all of the load cell assemblies placed inside the channels near the corners of the rectangular platform.

12. A low profile platform scale, comprising in combination:
    a substantially planar platform having an upper loading surface and a lower surface opposite said upper surface;
    a plurality of torsional load cells located beneath said platform and with said lower surface of said platform resting upon each of said plurality of torsional load cells;
    each torsional load cell including a first arm and a second arm joined together by a bridge;
    said first arm of each said torsional load cell including a foot extending below said first arm and adapted to rest upon an underlying surface;
    said second arm of each said torsional load cell having an upper surface with an elevated portion thereof that is higher than highest portions of said bridge and said second arm;
    said lower surface of said platform resting on said elevated portions of said second arms of said plurality of torsional load cells; and
    a rotational displacement transducer associated with each said torsional load cell.

13. A low profile platform scale, comprising in combination:
    a substantially planar platform having an upper loading surface and a lower surface opposite said upper surface;
    a plurality of load cells located beneath said platform and with said lower surface of said platform resting upon each of said plurality of load cells;

each load cell including a first arm and a second arm joined together by a bridge;

said first arm of each said load cell including a foot extending below said first arm and adapted to rest upon an underlying surface;

said second arm of each said load cell having an upper surface with an elevated portion thereof that is higher than highest portions of said bridge and said second arm;

said lower surface of said platform resting on said elevated portions of said second arms of said plurality of load cells;

wherein said platform has a planar central portion and lateral raised channel portions, said lateral raised portions positioned higher than said planar central portion, with at least one load cell under each said channel portion; and wherein said lateral raised channel portions each have a height above said planar central portion that is less than a height of said plurality of load cells, such that said planar central portion of said platform is located above an underlying substantially flat surface upon which said load cells rest.

14. The scale of claim 13 wherein a lateral wall extends between said lateral raised channel portions, said lateral wall extending up from said planar central portion non-parallel with said planar central portion.

15. The scale of claim 12 wherein said first arm and said second arm of each said load cell are substantially parallel with each other.

16. The scale of claim 15 wherein a limit pin is attached to said first arm of each said load cell and resides within a hole formed in said second arm of each said load cell, said limit pin adapted to provide resistance to movement of said second arm relative to said first arm when a load limit for the load cell has been reached;

wherein said platform has a planar central portion and lateral raised channel portions, said lateral raised portions positioned higher than said planar central portion, with at least one load cell under each said channel portion;

wherein said lateral raised channel portions each have a height above said planar central portion that is less than a height of said plurality of load cells, such that said planar central portion of said platform is located above an underlying substantially flat surface upon which said load cells rest;

wherein a lateral wall extends between said lateral raised channel portions, said lateral wall extending up from said planar central portion non-parallel with said planar central portion; and wherein said channels are formed continuous with said platform, said channels each including a pair of vertically oriented spaced walls which are parallel to each other and spaced by a width at least as great as a width of said load cells, said walls joined together by a top horizontal wall substantially perpendicular to said pair of vertical walls and with a front wall on each said channel perpendicular to both said pair of vertical walls and said top wall, said vertical walls, said top wall and said front wall each formed by bending of a common planar sheet of material which also provides said planar central portion.

17. The scale of claim 12 wherein each said load cell is formed as a unitary mass of material with said first arm and said second arm parallel to each other and spaced apart by a slot formed between said first arm and said second arm.

18. The scale of claim 17 wherein said platform has a planar central portion and lateral raised channel portions, said lateral portions positioned higher than said planar central portion, with at least one load cell under each said channel portion;

wherein said lateral raised channel portions each have a height above said planar central portion that is less than a height of said plurality of load cells, such that said planar central portion of said platform is located above an underlying substantially flat surface upon which said load cells rest; and wherein a lateral wall extends between said lateral raised channel portions, said lateral wall extending up from said planar central portion non-parallel with said planar central portion.

19. The scale of claim 18 wherein a limit pin is attached to said first arm of each said load cell and resides within a hole formed in said second arm of each said load cell, said limit pin adapted to provide resistance to movement of said second arm relative to said first arm when a load limit for the load cell has been reached.

* * * * *